Oct. 21, 1941.                W. S. RENIER                 2,259,489
             ACTUATING AND CONTROL MECHANISM FOR MACHINE TOOLS
                       Filed Oct. 31, 1939        2 Sheets—Sheet 1
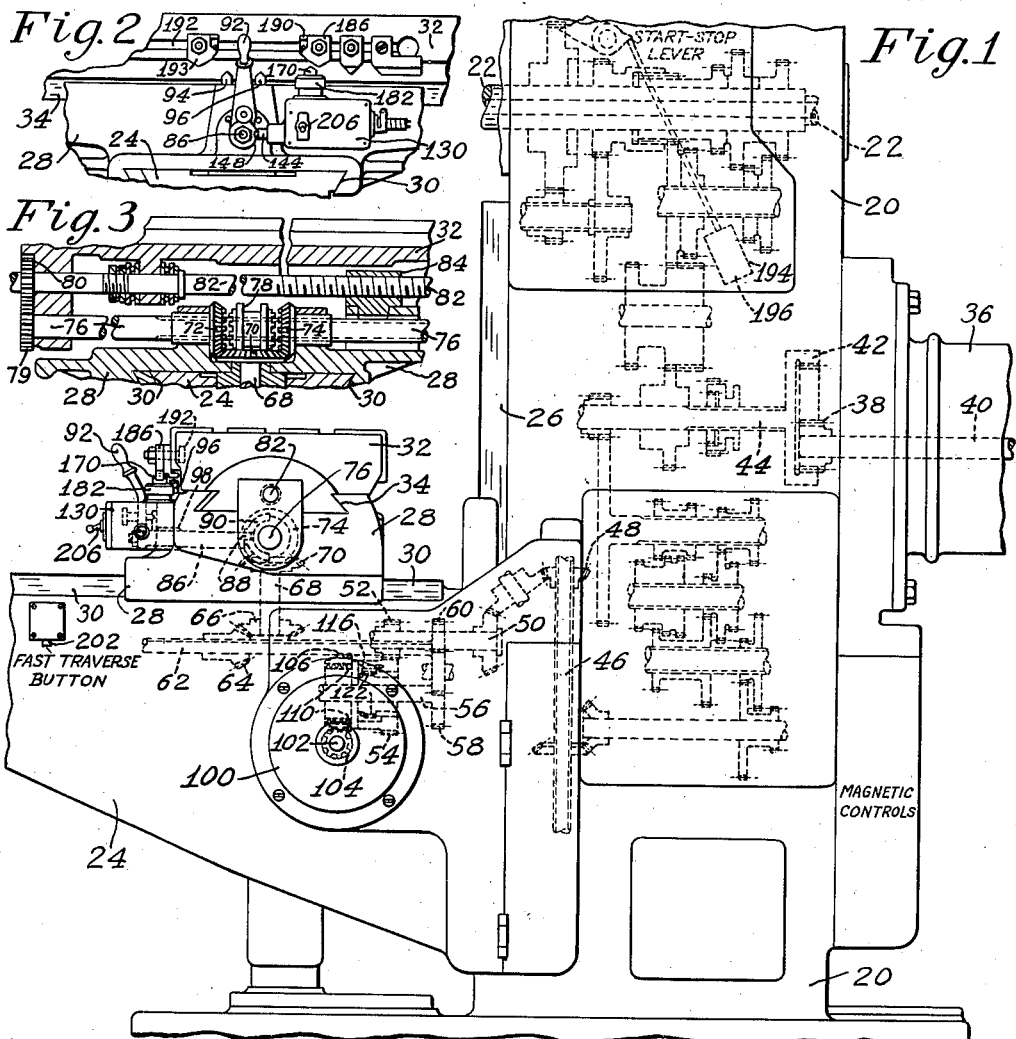
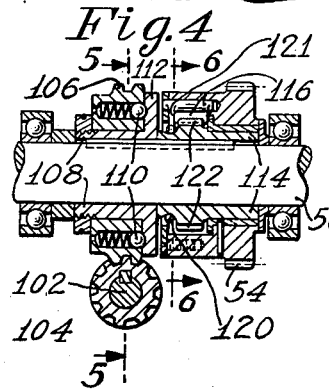
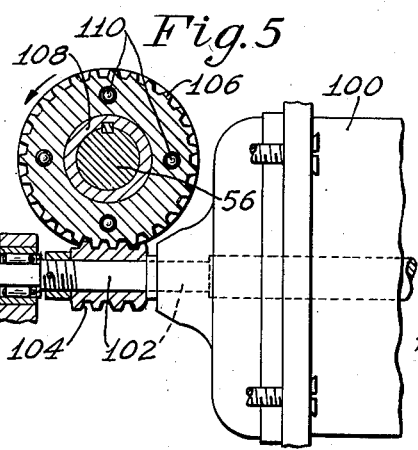
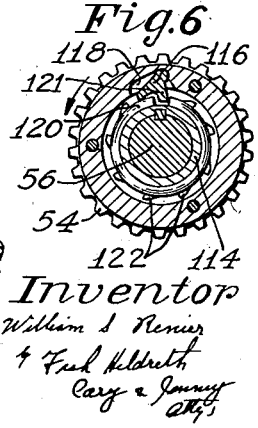
Witness
Charles T. Olson
Inventor
William S. Renier

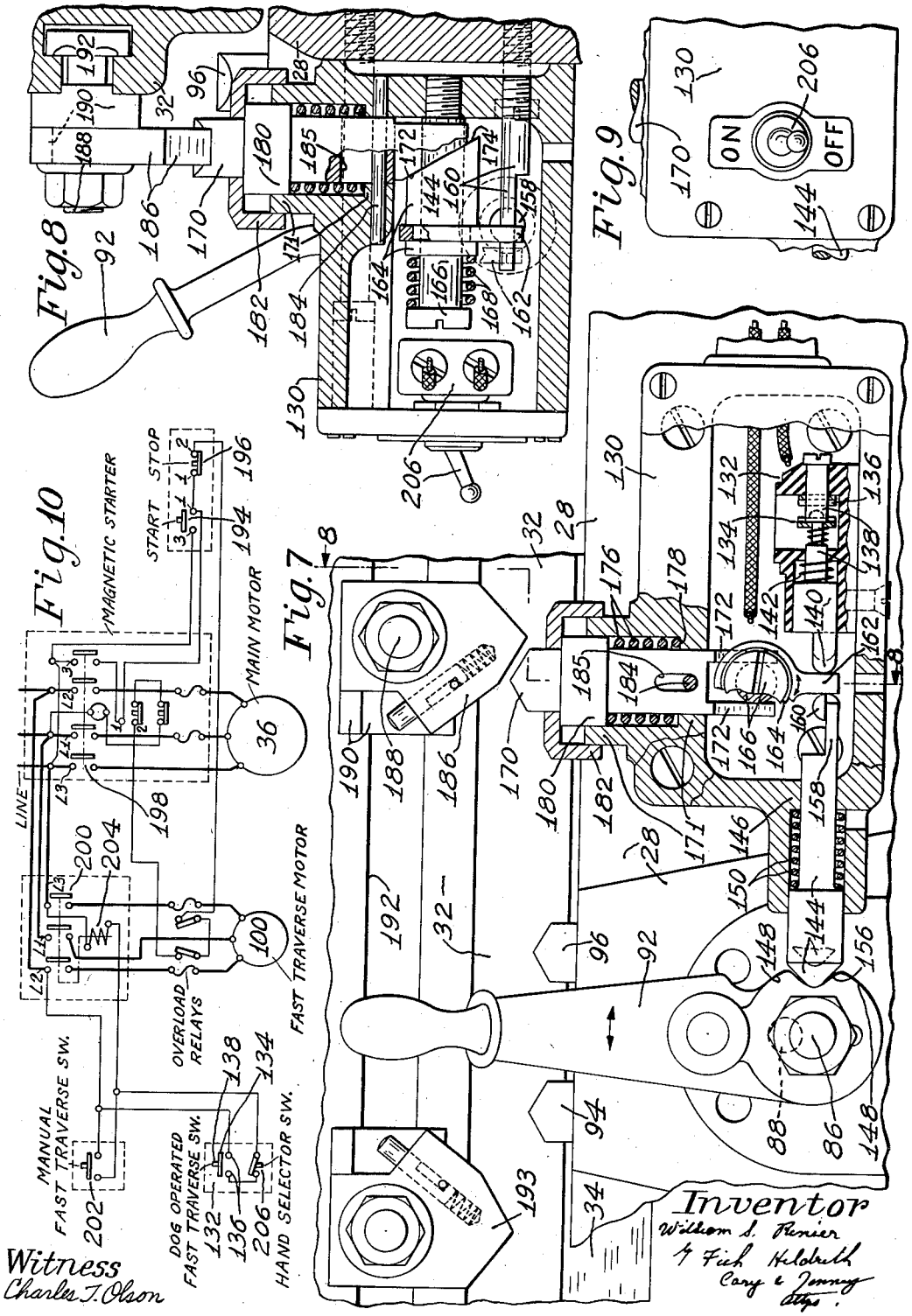

Patented Oct. 21, 1941

2,259,489

UNITED STATES PATENT OFFICE 2,259,489

ACTUATING AND CONTROL MECHANISM FOR MACHINE TOOLS

William S. Renier, Providence, R. I., assignor to Brown and Sharpe Manufacturing Company, a corporation of Rhode Island Application October 31, 1939, Serial No. 302,125

15 Claims. (Cl. 90—21)

The present invention relates to improvements in actuating and control devices for a reciprocable machine tool support, and more particularly to the provision of a novel and improved driving and control mechanism well adapted for controlling the operation of the work table in a milling machine of the so-called tool-room or non-automatic type.

The milling machine illustrated in the drawings as embodying in a preferred form the several features of the invention, comprises with a machine column and a horizontally extending milling cutter spindle, a work supporting assembly including a vertically adjustable knee, a transversely movable saddle, and a longitudinally reciprocable work table.

In accordance with the usual practice in machines of the type illustrated, the table, saddle and knee are arranged to be power actuated through the agency of manually operable controls. The power driving mechanism for the work table is constructed and arranged to drive the table at alternate feed and quick traverse rates and includes additionally a reverser and a table control or reversing lever which is shiftable between intermediate neutral and alternate running positions. In addition to the manual control of table operation provided by the reversing lever, automatically operating mechanism is provided in the form of table stop dogs and cooperating dog actuated plungers which act when rendered operative to shift the table reverser and reversing lever associated therewith to neutral position at the end of the table travel in each direction. The table may be driven at any one of a plurality of feed rates through the usual change speed gearing, or alternatively at a quick traverse rate through connections which include an overrunning clutch and a quick traverse motor mounted on the knee. In the illustrated embodiment of the invention, the shifting between feed and traverse rates of table movement is effected by means of switch connections which act to start and stop the quick traverse motor.

It is a principal object of the present invention to provide in a machine of this general description, a novel and improved actuating and control mechanism for the work table which is constructed and arranged to provide for feed and quick traverse operation of the table in accordance with a semi-automatic cycle of operation.

More specifically, it is an object of the invention to provide a novel and improved system for controlling the operation of the work table at feed and traverse rates which is responsive to manipulation of the table reversing lever to cause the table to operate at feed and traverse rates in accordance with a semi-automatic cycle of operation.

With these and other objects in view, as may hereinafter appear, the several features of the invention consist also in the devices, combinations and arrangement of parts, which together with the advantages to be obtained thereby will be readily understood by one skilled in the art from the following description taken in connection with the accompanying drawings, in which Fig. 1 is a view in right side elevation of a milling machine embodying therein the several features of applicant's invention; Fig. 2 is a detail view in front elevation of the work table reversing lever and applicant's improved feed quick traverse control unit associated therewith; Fig. 3 is a detail sectional view in front elevation illustrating the reversing clutch and screw and nut driving connections for the work table; Fig. 4 is an enlarged detail sectional view of the driving connections from the quick traverse motor including the overrunning clutch as illustrated in dotted lines in Fig. 1; Fig. 5 is a sectional view taken on the line 5—5 of Fig. 4; Fig. 6 is a detail sectional view taken on the line 6—6 of Fig. 4; Fig. 7 is an enlarged detail view partly in section illustrating the work table reversing lever and the associated feed quick traverse control associated therewith shown in outline in Fig. 2; Fig. 8 is a sectional view taken on the line 8—8 of Fig. 7; Fig. 9 is an enlarged detail view in front elevation showing the "on" and "off" switch for rendering the semi-automatic control of the feed traverse control operative or inoperative; and Fig. 10 is an electrical diagram showing the feed and quick traverse motors together with the operating switch connections for the same.

The milling machine herein disclosed as embodying in a preferred form the several features of the invention, comprises a machine column 20 having mounted thereon a horizontally extending milling cutter spindle 22 and a work supporting assembly including a knee 24 vertically adjustable on ways 26 on the column, a saddle 28 supported for transverse movements on ways 30 on the knee 24, and a longitudinally movable work table 32 mounted on guideways 34 on the saddle 28. The power drive for the cutter spindle and for the table, saddle and knee may be of ordinary description, but will be briefly described in connection with the dotted line illustration in Fig. 1. Power is taken from a main driving motor 36 supported on the rear side of the column 20. A pinion 38 on the armature shaft 40 of the motor meshes with an internal gear 42 on a main drive shaft 44. The spindle 22 is driven from shaft 44 through change speed gears as generally indicated in dotted lines in Fig. 1. The table, saddle and knee are connected to be driven at feeding rates from the drive shaft 44 through a chain of change speed gears, connecting with a vertical spline shaft 46 in the column, which is in turn connected through a train of bevel gears including a spline gear 48 splined to the shaft 46, to a horizontally located feed drive shaft 50 in the knee 24. From the feed drive shaft 50 the drive is taken through a gear 52 to an over-running clutch gear 54 on a clutch shaft 56.

The clutch shaft 56 mounted in the knee is connected through branch transmissions to effect power operation of each of the table, saddle and knee. Inasmuch as these branch transmissions may be of ordinary description, further description of the drives to the saddle and knee is omitted, and the driving connections to the table will be described only so far as believed necessary to illustrate the connection of the present invention therewith. These connections include the gears 58 and 60 connecting the clutch shaft 56 to drive a spline shaft 62 in the knee. A bevel gear 64 splined to the shaft 62 meshes with a gear 66 secured to a vertical shaft 68 in the saddle. The table 32 is driven from the vertical shaft 68 through a reverser having intermediate neutral and alternate running positions. A bevel gear 70 on the upper end of the shaft 68 meshes with two reversely driven clutch gears 72, 74 loosely sleeved on horizontally disposed table drive shaft 76, and externally supported in bearings in the saddle 28. A reversing clutch member 78 splined to the shaft 76 between the clutch gears 72, 74 is arranged to be moved from an intermediate neutral position into driving engagement with either of the clutch gears. Gears 79 and 80 connect the table drive shaft 76 to drive the feed screw shaft 82 which is supported in an end thrust bearing in the table for engagement with a relatively stationary nut 84 carried by the saddle 28.

As best shown in Figs. 1 and 2, the position of the reversing clutch member 78 is controlled by means of a clutch shifting rock shaft 86 having formed on the rear end thereof, an eccentric pin 88 which engages with a clutch shoe 90 mounted in a peripheral groove on the clutch member 78. The rock shaft 86 is provided at its front end with the usual table control or reversing lever 92 which is shiftable from a vertical neutral position as shown in Fig. 2, in either direction to start the table in the desired direction. Further in accordance with the usual practice, the table reverse connections including the rock shaft 86, the clutch member 78 and hand lever 92 are arranged to be shifted automatically from either of their running positions to neutral position to arrest movement of the table by means of reversing dogs and cooperating rack plungers designated at 94 and 96 in Fig. 2, which mesh with opposite sides of a pinion 98 formed on the rock shaft 86 (see Fig. 1).

Quick traverse operation of the table, saddle and knee is effected by means of a quick traverse drive including a quick traverse electric motor 100 which is connected to operate the clutch shaft 56 at a quick traverse rate overdriving the clutch gear 54. As best shown in Figs. 4, 5 and 6, an armature shaft 102 of the quick traverse motor 100 has mounted thereon a worm 104 for engagement with a worm gear 106 loosely supported on a sleeve member 108 keyed to the shaft 56. Spring-pressed balls 110 carried in recesses in the worm gear 106 are arranged for engagement with slight recesses formed in an adjacent face 112 of the sleeve member 108 to provide a yieldable driving connection between the quick traverse motor and the drive shaft 56.

The clutch gear 54 as will be readily seen from an inspection of Figs. 4 and 6, is rotatably supported on a sleeve member 114 keyed to the shaft 56, and is connected to drive the sleeve member through an overrunning clutch connection which includes a pawl 116 pivotally supported in a recess 118 formed in the inside face of the gear member for engagement with a series of ratchet teeth 122 on the sleeve member 114. A wire loop 120 frictionally engaging in an annular groove in the sleeve member 114 engages a tail 121 of the pawl 116 to control the angular position thereof. Upon the starting of the quick traverse motor, the shaft 56 and sleeve 114 will be driven ahead of the feed driving gear 54, and the pawl 116 will be swung outwardly and held in its recess through the action of the wire loop 120. When the quick traverse motor is again stopped, the resulting tendency of the shaft 56 to slow down relative to the continuously driven clutch gear 54 will cause the pawl 116 to be moved into locking engagement with the ratchet teeth 122.

In accordance with the present invention, applicant has provided a novel and improved control system for controlling the operation of the work table of the machine at feed and quick traverse rates in either direction of travel. With applicant's improvements it is possible to provide for a semi-automatic operation of the work table from the reversing lever 92 of the machine in accordance with an operating cycle, in which shifting of the reversing lever from its neutral position to start operation of the table, will operate automatically to start the quick traverse motor to drive the table at the quick traverse rate. The quick traverse motor is then subsequently de-energized as the milling cutter approaches the work through the operation of an adjustable table feed dog, and movement of the table then continues at the feed rate to the end of its travel, when it may be arrested through the operation of the usual table stop dog which also acts to return the reversing lever 92 to its intermediate neutral position. Further in accordance with the invention, this return movement of the reversing lever to its neutral position acts to reset the control mechanism so that subsequent movement of the reversing lever to the reverse operating position will again operate to start the traverse motor to drive the table at the quick traverse rate.

Applicant's improved control mechanism takes the form of a unit or housing 130 in which is mounted a quick traverse switch generally indicated at 132. As best shown in Fig. 7, the switch 132 comprises a switch arm 134 arranged to bridge contacts 136, and supported on a switch plunger 138. For actuating the switch there is provided integrally therewith a plunger 140 which acts when moved inwardly to close the switch against the pressure of a spring 142.

The quick traverse switch 132 is shifted to and is held in its closed position to operate the quick traverse motor and table driven thereby at the quick traverse rate, by means of connections from the reversing lever 92 which include a spring-pressed plunger 144 which is slidably supported in a bearing 146 in the housing 130, and is arranged to bear against the peripheral cam surface of a cam 148 secured to turn with the rock shaft 86 and reversing lever 92. A compression spring 150 coiled about a reduced shank portion of the plunger 144, and seated against a shoulder on the housing 130, tends to hold the plunger 144 in engagement with the cam 148. As best shown, for example, in Fig. 7, when the reversing lever 92 and the clutch 78 controlled thereby are in their intermediate neutral position, the plunger 144 will be permitted to occupy a fully retracted position through engagement with a recess 156 formed in the peripheral edge of the cam 148. At its inner end the plunger 144 is partially cut away to provide a flattened extension 158 which engages beneath a cooperating flat formed on a cross pin 160 secured to the housing 130.

The plunger 144 contacts with a switch actuator arranged to be interposed between the extension 158 of the plunger 144 and the switch plunger 140, so that movement of the reversing lever 92 from its intermediate neutral position will act by shifting the plunger 144 and interposed switch actuator to the right, to depress the switch plunger 140 and close the quick traverse switch. The switch actuator is further arranged so that it can be withdrawn from between the extension 158 and plunger 140, when so desired to permit the return of the quick traverse switch 132 to its open position and the continued operation of the table at the feed rate prior to the return of the reversing lever 92 and plunger 144 actuated thereby to the neutral position of Fig. 7.

The switch actuator referred to, comprises a downwardly extending tongue 162 carried on a sleeve member 164 loosely sleeved for both rotational and axial movements on a stud 166 extending transversely of the plunger 144 and switch plunger 140. A compression spring 168 coiled about the stud between the enlarged head thereof and the sleeve member 164, tends to move the switch actuator rearwardly into a position of alignment with the extension 158 of plunger 144 and the plunger 140.

In order that the quick traverse switch 132 may be shifted to its open position by the operation of a table dog during continued travel of the work table, mechanism is provided in the form of a dog actuated plunger 170 which acts when forced downwardly to shift the switch actuator and particularly the tongue 162 out of alignment with the plunger 144 and extension 158, thus permitting the switch actuator tongue 162 and switch plunger 140 to be moved outwardly under the pressure of spring 142 to open position. As best shown in Figs. 7 and 8, the plunger 170 is supported for vertical movement in a bearing 171 formed in the housing 130. The plunger 170 is bifurcated at its lower end to straddle the pivot pin 166, and is formed with cammed surfaces 172 for engagement with a correspondingly cammed end surface 174 of the sleeve member 164. A compression spring 176 coiled about the plunger 170 between a shoulder 178 formed in the plunger bearing and an enlarged portion 180 of the plunger, tends normally to maintain the same in a fully raised position in which the enlarged portion 180 engages against a plunger cap member 182. A pin 184 fixed in the housing 132 and passing through a slot 185 in the plunger 170 prevents rotational movement of the plunger in its bearing. The plunger 170 is arranged to be acted upon by table dogs which may be of ordinary description as that designated at 186 pivotally mounted at 188 on a holder 190 carried in a T-shaped slot 192 on the front side of the table. The dog 186 is pivotally mounted on its stud for movement in a clockwise direction from a fixed stop position, so that the dog will be rendered operative to depress the plunger 170 only during table movement to the left. A table right stop dog is designated at 193 in Figs. 2 and 7.

The electrical operating connections for the machine as best shown in Fig. 10, include specifically the main motor 36 and fast traverse motor 100. For starting and stopping the operation of the machine, there is a manually operable start switch 194 and a stop switch 196. The closing of the start contact 3—1 of the start switch 194, acts to close the line switch 198 and to start the main motor 36. The starting and stopping of the fast traverse motor 100 is independently controlled through the opening and closing of a line switch 200. The connections for controlling the operation of this switch include a manual control switch 202 which may be of ordinary description, and applicant's improved semi-automatic control provided by the quick traverse switch 132 above described. The closing of either the manual quick traverse switch 202 or the semi-automatic control switch 132 will act to energize a relay coil 204 associated with the fast traverse motor line switch 200. In order that the semi-automatic control of the table quick traverse operation from the reversing lever 92 may be rendered operative or inoperative as may be desired, a selector switch 206 is provided having alternative "on" and "off" positions in which the circuit containing the automatic quick traverse control switch 132 is opened or closed.

The operation of applicant's control system for controlling the operation of the table will be briefly described by way of example in connection with a semi-automatic cycle for the performance of a milling operation of conventional pattern including quick traverse followed by feed in one direction, and with a quick traverse return to starting position. Assuming that the selector switch 206 is in its "on" position, the operator now shifts the table control lever 92 from its neutral position to start table movement in the desired direction. This movement of the hand lever 92 causes the plunger 144 to ride out of the recess 156 shifting the plunger to the right, and acting through the switch actuator tongue 162 and switch plunger 140 to close the quick traverse control switch 132. Inasmuch as the hand lever 92 remains in running position during the continued travel of the table, the plunger 144 is continuously held in its retracted position against the pressure of its spring 150 and the fast traverse switch 132 is consequently held in its closed position. As the table and work supported thereon now approach the milling cutter of the machine, the plunger 170 engages with and is depressed by its actuating dog 186, shifting the switch actuator 164 axially against the pressure of its spring 168 out of alignment with the extension 158 of the reversing lever actuating plunger 144. This is the position shown in dot-and-dash lines in Fig. 8. The actuator tongue 162 is immediately permitted to swing in a clockwise direction as shown in Fig. 7, into contact with the positioning pin 160. The switch plunger 140 and switch arm 134 move to open position under the influence of their spring 142; thus de-energizing relay 204, and allowing the quick traverse motor line switch 200 to open, de-energizing the quick traverse motor 100. The table continues to the end of its travel at the feed rate, and is then stopped through the engagement of a table stop dog with one of the plungers 94, 96 which acts to shift the reversing clutch member 78 and table control lever 92 to neutral position. The return of the reversing lever 92 to neutral position acts automatically to reset the quick traverse control in the following manner. The plunger 144 urged by its spring 150 moves to the left into engagement with the recess 156 in the cam disk 148. The switch actuator including the sleeve 164 and the tongue 162, previously resting against one side of the extension 158 of the plunger 144, is now permitted to slide rearwardly on its pin 166 under the influence of the spring 168 to re-position the tongue 162 between the switch plunger 140 and the lever actuated plunger 144. When the operator again operates the table control lever 92 to return the table to its initial position, the shifting of the plunger 144 to the right from its position shown in Fig. 7, acts to close the quick traverse switch 132 causing the table to be returned to its starting position at the quick traverse rate.

It will be understood that the invention is not limited to the specific embodiment shown, and that various deviations may be made therefrom without departing from the spirit and scope of the appended claims.

What is claimed is:

1. An actuating and control mechanism for a machine tool having a reciprocable support, which comprises power driving means for the support operable to drive the support at alternate feed and quick traverse rates, reversing means associated with said driving means to reverse the direction of support movement, a manually operable control lever for said support having intermediate neutral and reverse running positions, a feed-quick traverse control mechanism comprising a connection operable by movement of the control lever to a running position to effect support movement at the traverse rate, and means acting independently of said reversing lever when rendered operative during continued support movement in one direction for actuating said feed quick traverse control mechanism to effect support movement at the feed rate.

2. An actuating and control mechanism for a machine tool having a work support, a tool support, and power driving means for effecting translatory movements of one of said supports including feed and quick traverse driving connections and reversing means for said connections, a control lever for said movable support having intermediate neutral, and reverse running positions, a feed-quick traverse control device for said connections shiftable to operate the reciprocable support at feed and quick traverse rates, a connection with the control lever actuable by movement of the control lever to a running position to shift said control device to quick traverse position, a control dog, and an element actuable thereby to disable said connection and to shift said control device to feed position.

3. An actuating and control mechanism for a machine tool having a reciprocable support, which comprises power driving means for the support operable to drive the support at alternate feed and quick traverse rates, reversing means associated with said driving means to reverse the direction of support movement, a manually operable control lever for said support having intermediate neutral and control running positions, table stop dogs acting when rendered operative to shift said reversing means and control lever to neutral position, and a feed-quick traverse control mechanism comprising a connection operable by movement of the control lever to a running position to effect support movement at the traverse rate, a table dog, and a control element actuable thereby to disable said connection and to effect continued support movement at the feed rate.

4. An actuating and control mechanism for a machine tool having a reciprocable support, which comprises power driving means for the support operable to drive the support at alternate feed and quick traverse rates, reversing means associated with said driving means to reverse the direction of support movement, a manually operable control lever for said support having intermediate neutral and reverse running positions, a semi-automatic feed-quick traverse control mechanism comprising a connection operable by movement of the control lever from neutral position to effect support movement at the traverse rate, and means acting when rendered operative during continued support movement in one direction to disable said connection and to effect support movement at the feed rate, an independently operable manual control for effecting alternate feed-quick traverse operation of the support, and a selector device for rendering said semi-automatic feed traverse control mechanism including said connection operative and inoperative to control the rate of support movement.

5. An actuating and control mechanism for a machine tool having a reciprocable support, which comprises power driving means for the support operable to drive the support at alternate feed and quick traverse rates, reversing means associated with said driving means to reverse the direction of support movement, a manually operable control lever for said support having intermediate neutral and reverse running positions, a semi-automatic feed-quick traverse control mechanism comprising a feed-quick traverse control element shiftable to effect support movement alternately at feed and quick traverse rates, a connection arranged to be shifted from and returned to an initial position by movement of the control lever from and to its neutral position, an actuator member arranged to be interposed in the path of movement of said connection for actuation thereby to shift the feed-quick traverse control element to traverse position, a feed dog on the support, and means actuable thereby for moving the actuator member out of the path of said connection and thereby to cause the feed quick traverse control element to be shifted to feed position.

6. An actuating and control mechanism for a machine tool having a reciprocable support which comprises power driving means for the support operable to drive the support at alternate feed and quick traverse rates, reversing means associated with said driving means to reverse the direction of support movement, a manually operable control lever for said support having intermediate neutral and reverse running positions, and a feed-quick traverse control mechanism comprising a feed-quick traverse electrical control switch, and connections controlled thereby for driving the table alternatively at feed and quick traverse rates, a connection with the control lever actuable by movement of the control lever from neutral position for shifting said switch to quick traverse position, a feed dog on the support, and a control element actuable thereby to disable said connection and to shift said switch to feed position.

7. An actuating and control mechanism for a machine tool having a reciprocable support, which comprises power driving means for the support operable to drive the support at alternate feed and quick traverse rates, reversing means associated with said driving means to reverse the direction of support movement, a manually operable control lever for said support having intermediate neutral and alternate running positions, and a feed-quick traverse control mechanism comprising a feed-quick traverse switch, and connections controlled thereby for driving the support alternatively at feed and quick traverse rates, a plunger and an actuating cam therefor associated with the control lever, and a switch actuator arranged to be interposed in the path of the control lever actuated plunger for shifting the switch to traverse position, whereby movement of the control lever actuated plunger is rendered operative to shift the switch to quick traverse position, a feed dog on the support, and means actuable thereby for disengaging said switch actuator from the plunger and thereby to cause the switch to be shifted to feed position.

8. An actuating and control mechanism for a machine tool having a reciprocable support which comprises power driving means for the support operable to drive the support at alternate feed and quick traverse rates, reversing means associated with said driving means to reverse the direction of support movement, a manually operable control lever for said support having intermediate neutral and alternate running positions, and feed-quick traverse control mechanism comprising a feed-quick traverse switch and connections controlled thereby for driving the support alternatively at feed and quick traverse rates, a connection arranged to be shifted from and returned to an initial position by movement of the control lever from and to its neutral position, a switch actuator arranged to be interposed in the path of movement of said connection for actuation thereby to shift the switch to traverse position, a feed dog on the support, and means actuable thereby for moving said switch actuator out of the path of said connection and thereby to cause the switch to be shifted to feed position.

9. An actuating and control mechanism for a machine tool having a reciprocable support which comprises power driving means for the support operable to drive the support at alternate feed and quick traverse rates, reversing means associated with said drive means to reverse the direction of support movement, a manually operable control lever for said support having intermediate neutral and alternate running positions, and feed-quick traverse control mechanism comprising a feed-quick traverse switch and connections controlled thereby for driving the support alternatively at feed and quick traverse rates, a connection arranged to be shifted from and returned to an initial position by movement of the control lever from and to its neutral position, a switch actuator arranged to be interposed in the path of movement of said connection for actuation thereby to shift the switch to traverse position, a feed dog on the support, means actuable thereby for moving said switch actuator out of the path of said connection and thereby to cause the switch to be shifted to feed position, and means rendered operative by movement of the control lever and connection controlled thereby to neutral position to reset the switch actuator in the interposed position.

10. An actuating and control mechanism for a machine tool having a reciprocable support which comprises power driving means for the support operable to drive the support at alternate feed and quick traverse rates, reversing means associated with said drive means to reverse the direction of support movement, a manually operable control lever for said support having intermediate neutral and alternate running positions, and feed-quick traverse control mechanism comprising a feed-quick traverse switch and connections controlled thereby for driving the support alternatively at feed and quick traverse rates, a plunger arranged to be shifted from and returned to an initial position by movement of the control lever from and to its neutral position, spring means for holding the switch in feed position, a switch actuator, a pivotal support on which the actuator is axially shiftable to be interposed in the path of the plunger, and rotatable thereon by said plunger during movement from its initial position to shift the switch to quick traverse position, and means acting when rendered operative for shifting said switch actuator axially out of alignment with the plunger and thereby to permit return of the switch to its feed position.

11. An actuating and control mechanism for a machine tool having a reciprocable support which comprises power driving means for the support operable to drive the support at alternate feed and quick traverse rates, reversing means associated with said drive means to reverse the direction of support movement, a manually operable control lever for said support having intermediate neutral and alternate running position, and feed-quick traverse control mechanism comprising a feed-quick traverse switch and connections controlled thereby for driving the support alternatively at feed and quick traverse rates, a plunger arranged to be shifted from and returned to an initial position by movement of the control lever from and to its neutral position, spring means for holding the switch in feed position, a switch actuator, a pivotal support on which the actuator is axially shiftable to be interposed in the path of the plunger, and rotatable thereon by movement of the plunger from its initial position to shift the switch to quick traverse position, a stop member limiting rotational movement of the switch actuator in the reverse direction, spring means tending to move the switch actuator axially into alignment with the plunger, a feed dog on the reciprocable support, and a dog actuated plunger having a cam connection with said switch actuator actuable by movement of the feed plunger to shift the switch actuator axially out of alignment with the plunger and thereby to permit the return of the switch to its feed position.

12. An actuating and control mechanism for a machine tool having a reciprocable support, which comprises power driving connections operable to drive the support at alternate feed and quick traverse rates, a reversing clutch, a manually operable control lever for controlling said clutch having a neutral and reverse running positions, selecting means in said connections for driving the support through said clutch at alternate feed and traverse rates, a feed-quick traverse control mechanism comprising a connection operable by movement of the control lever to a running position for actuating said selecting means to effect support movement at the traverse rate, and means acting when rendered operative during continued support movement in one direction for disabling said connection and for actuating said selecting means to continue support movement at the feed rate.

13. An actuating and control mechanism for a machine tool having a reciprocable support which comprises power driving connections operable to drive the support at alternate feed and quick traverse rates, a reversing clutch, a manually operable control lever for controlling said clutch having a neutral and reverse running positions, selecting means in said connections for driving the support through said clutch at alternate feed and traverse rates, a feed-quick traverse control mechanism comprising a connection operable by movement of the control lever to a running position for actuating said feed quick traverse device to effect support movement at the traverse rate, and means to operatively connect and to disconnect said connection from the control lever whereby movement of the control lever to a running position is effective to start support movement selectively at the traverse or feed rate.

14. An actuating and control mechanism for a machine tool having a reciprocable support, which comprises power driving connections operable to drive the support at alternate feed and quick traverse rates, a reversing clutch, a manually operable control lever for controlling said clutch having a neutral and reverse running positions, selecting means in said connections for driving the support through said clutch at alternate feed and traverse rates, a feed-quick traverse control mechanism comprising a connection operable by movement of the control lever to a running position for actuating said selecting means to effect support movement at the traverse rate, means acting when rendered operative during continued support movement in one direction for disabling said connection and for actuating said selecting means to continue support movement at the feed rate, and means to operatively connect and to disconnect said connection from the control lever whereby movement of the control lever to a running position is effective to start support movement selectively at the traverse or feed rate.

15. An actuating and control mechanism for a machine tool having a reciprocable support, which comprises power driving connections operable to drive the support at alternate feed and quick traverse rates, a reversing clutch, a manually operable control lever for controlling said clutch having a neutral and reverse running positions, selecting means in said connections for driving the support through said clutch at alternate feed and traverse rates, a feed-quick traverse control mechanism comprising a connection operable by movement of the control lever to a running position for actuating said selecting means to effect support movement at the traverse rate, means acting when rendered operative during continued support movement in one direction for disabling said connection and for actuating said selecting means to continue support movement at the feed rate, and means rendered operative by the return movement of the control lever to neutral position to re-establish said connection.

WILLIAM S. RENIER.